US006970954B1

(12) United States Patent
Guy et al.

(10) Patent No.: US 6,970,954 B1
(45) Date of Patent: Nov. 29, 2005

(54) SYSTEM AND METHOD FOR INTERCEPTING AND EVALUATING COMMANDS TO DETERMINE IF COMMANDS ARE HARMFUL OR BENIGN AND TO EMULATE HARMFUL COMMANDS

(75) Inventors: Gideon Guy, Chatsworth, CA (US); Eugenio Allevato, Northridge, CA (US)

(73) Assignee: Logicube, Inc., Chatsworth, CA (US)

( * ) Notice: Subject to any disclaimer, the term of this patent is extended or adjusted under 35 U.S.C. 154(b) by 301 days.

(21) Appl. No.: 10/400,989

(22) Filed: Mar. 27, 2003

(51) Int. Cl.[7] .......... G06F 13/00; G06F 12/14; G06F 11/30; G06F 11/00
(52) U.S. Cl. .......... 710/16; 710/5; 710/14; 710/15; 710/31; 710/38; 710/65; 709/230; 713/200; 713/202; 714/35; 711/152; 711/163
(58) Field of Search .......... 710/5, 14–16, 710/31, 38, 65; 714/35; 713/200, 202; 711/152, 711/163; 709/230

(56) References Cited

U.S. PATENT DOCUMENTS

| | | | |
|---|---|---|---|
| 5,596,713 A * | 1/1997 | DeRoo et al. ............... | 714/35 |
| 5,867,648 A * | 2/1999 | Foth et al. ............... | 709/230 |
| 6,131,141 A | 10/2000 | Ravid | |
| 6,179,492 B1 | 1/2001 | Guy | |
| 6,330,648 B1 * | 12/2001 | Wambach et al. .......... | 711/163 |
| 6,871,283 B1 * | 3/2005 | Zurko et al. ............... | 713/200 |
| 2002/0002685 A1 * | 1/2002 | Shim ......................... | 713/200 |

* cited by examiner

Primary Examiner—Tammara Peyton
(74) Attorney, Agent, or Firm—SoCal IP Law Group LLP; Mark Andrew Goldstein

(57) ABSTRACT

Systems, methods, and devices for nondestructive data transfer are disclosed. A method comprises monitoring commands directed to a storage device and evaluating the commands to determine whether the commands are harmful or benign. Benign commands are presented to the storage device. If a command is harmful to the contents of the storage medium, a replacement command is presented to the storage device, and a response expected from the storage device is emulated. A device implementing the method may include an intercept logic, a bridge unit and an isolate switch. In an embodiment of a system that implements the method, the device is coupled between a storage device and a computing device. The method may be implemented in software instructions stored on a machine readable medium and executed by a processor.

21 Claims, 6 Drawing Sheets

SYSTEM AND METHOD FOR INTERCEPTING AND EVALUATING COMMANDS TO DETERMINE IF COMMANDS ARE HARMFUL OR BENIGN AND TO EMULATE HARMFUL COMMANDS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates the transferring of data from a source medium without altering the contents of the source medium.

2. Description of Related Art

Computers have become ubiquitous in modern society. Students use computers for research and writing, artists use computers for drawing, and so on. The vast majority of people use computers for beneficial purposes. However, computers may also be put to malicious use. Criminals of all kinds use computers to further their goals. White collar criminals may use computers to steal private banking or financial information from companies and individuals. Sex offenders may use computers to view illegal pornography and entrap children and adults in illegal schemes. Terrorists may use computers to plan evil acts. Just as the list of beneficial uses of computers is endless, so is the list of malicious and criminal uses.

Most computers include a hard disk to store data. When a computer is used for criminal purposes, evidence of the offender's criminal acts may be stored on the hard disk. Investigative agencies such as police, secret service, district attorney, Federal Bureau of Investigation and other organizations may obtain an offender's computer as evidence of criminal activity. In such circumstances, the integrity of the evidence on the hard disk of the offender's computer must be maintained while the data on the hard disk is examined for evidence of malicious acts. That is, investigators must preserve the content of the hard disk as of the time the hard disk was taken into evidence while the investigators evaluate the contents of the hard disk.

However, in personal computers running versions of Microsoft Windows and many other operating systems, when a hard disk is accessed in any way, the operating system writes various files to the hard disk. As such, if a suspect's hard disk is removed from a suspect's computer and installed in an investigator's computer, the investigator's computer writes information to the hard disk, thus altering the contents of the hard disk and compromising the evidentiary value of the hard disk. Various operating systems write data to storage devices when performing reads or otherwise accessing the storage devices. In addition, the investigator might inadvertently copy or move files, or otherwise make alterations to the drive under investigation.

DETAILED DESCRIPTION OF THE INVENTION

Throughout this description, the embodiments and examples shown should be considered as exemplars, rather than limitations on the apparatus and methods of the invention.

Description of Systems and Devices

The systems and methods described herein allow an investigator or other person to copy data from or read data from a storage medium while preserving the contents of the storage medium. In another embodiment, the systems and methods described herein allow a writeable storage device to be accessed in a read-only manner.

As used herein, storage medium refers to any means for storing data including magnetic disks such as hard disks and floppy disks, optical disks such as readable and writeable compact disks (CD-RW) and digital versatile disks (DVD-RW), magnetic tape, and solid state flash memory cards such as, for example, CompactFlash brand memory cards, MultiMediaCard cards, SmartMedia brand memory cards, SD brand memory cards, Memory Stick brand memory sticks, flash memory drive devices, and any other readable and writeable storage media. As used herein, a storage device is a device that allows for reading and writing to a storage medium. As used herein, the terms storage device and storage medium may nonetheless be used interchangeably. This is particularly so in those circumstances where a storage device includes a storage medium, such as in the case of a hard disk drive. The storage device may be included with or otherwise coupled or attached to a computing device.

A computing device as used herein refers to any device with a processor that may execute instructions including, but not limited to, personal computers, server computers, computing tablets, set top boxes, video game systems, cellular telephones, personal digital assistants (PDAs), forensic analysis devices, portable computers, and laptop computers. These computing devices may run any operating system, including, for example, variations of the Linux, Unix, MS-DOS, Microsoft Windows, Palm OS, and Apple Mac OS X operating systems.

Figure 1:
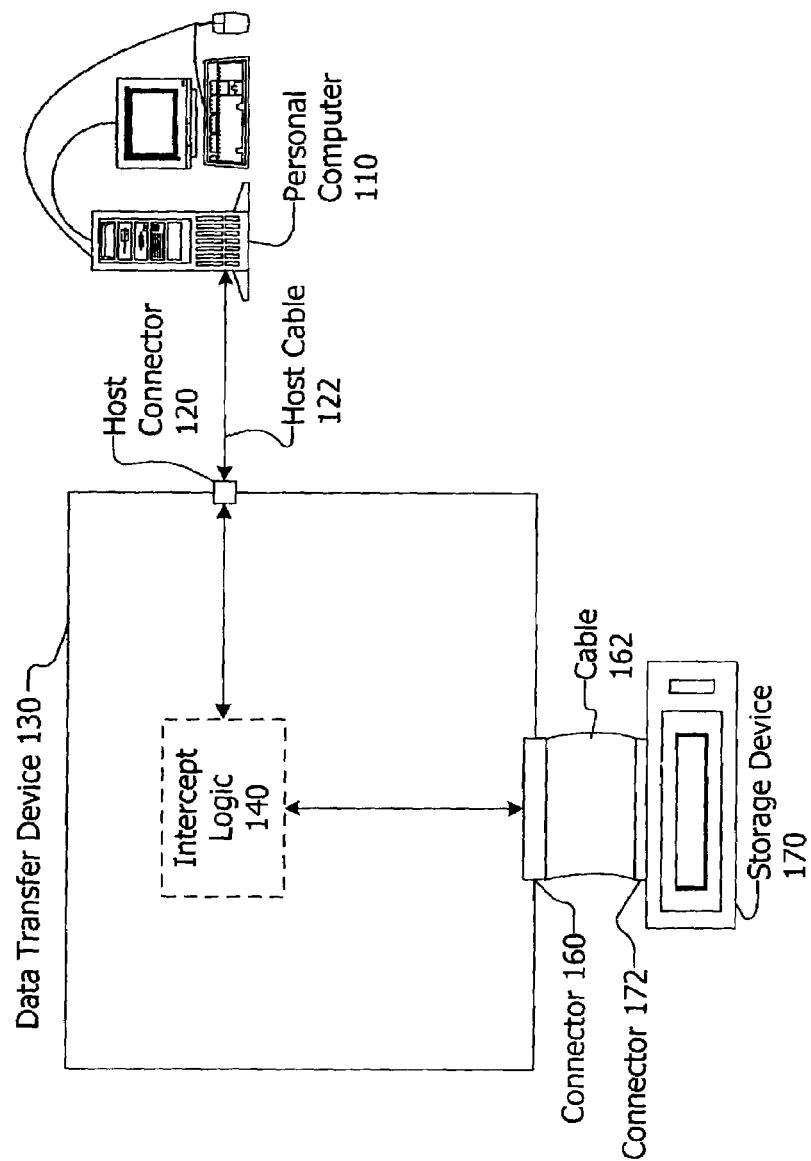
FIG. 1 is a block diagram of a first system in accordance with the invention.

FIG. 1 is a block diagram of a first system in accordance with the invention. The data transfer device 130 may be coupled between a computing device such as personal computer 110 and a storage device 170. Storage device 170 may include a permanently installed storage medium such as, for example, a hard disk, or a removable storage medium such as, for example, a floppy disk, a CD-RW, and a flash memory card. Data transfer device 130 allows a user of personal computer 110 to read data from a storage medium in storage device 170 while preserving the integrity of the contents of the storage medium as evidence. Data transfer device 130 provides non-destructive access to storage device 170 by replacing any attempts to write or erase data with a harmless replacement command, and emulating any expected responses to the personal computer 110. A harmless replacement command is a command that does not write data to, erase data from or otherwise alter the contents of storage device 170. Example replacement commands include read, seek, and others.

Cable 162 connects data transfer device 130 to storage device 170 via connectors 160 and 172. In one embodiment, the storage device 170 is a hard disk drive that conforms to a version of the Advanced Technology Attachment (ATA) standards, the cable 162 is a ribbon cable, and connectors 160 and 172 are Integrated Drive Electronics (IDE) connectors. As used herein, ATA also includes the ATA Packet Interface (ATAPI), IDE, Enhanced IDE (EIDE), their variants (ATA-2 and ATA/100, for example), and other hard disk standards. The hard disk may be an ATA/IDE compatible hard disk and/or may be compatible with other hard disk standards. The format of the hard disk may be any format, such as, for example, File Allocation Table 16 bit (FAT-16), FAT-32, new technology file system (NTFS), and Hierarchical File System (HFS).

In other embodiments, the storage device 170 may be any storage device. In these other embodiments, the cable 162 and connectors 160 and 172 may conform to any standard by which the storage device 170 may be accessed, such as, for example, without limitation, any version of the USB, IEEE 1394, IDE, ATA, small computer system interface (SCSI), and Fibre Channel standards. These standards are referred to herein as data transfer standards.

In one embodiment, the data transfer device 130 is coupled to personal computer 110 via a USB cable such that the host connector 120 and host cable 122 are a USB connector and a USB cable. In another embodiment, the host connector 120 and host cable 122 conform to the IEEE 1394 (more commonly known as firewire) standard. In other embodiments, the host connector 120 may be any host or peripheral connector and the host cable 122 may be any corresponding host or peripheral cable. The host connector 120 and cable 122 may conform to any of the data transfer standards.

The intercept logic 140 may be hardware or software that monitors all commands that are directed to the storage device 170 from the personal computer 110. Generally, the intercept logic 140 intercepts all commands and determines whether they are harmful or benign. As used herein, a benign command is a command that accesses the storage device without erasing any data from or writing any data to the storage medium. Benign commands include read, seek, and the like. Harmful commands are those commands which would cause alteration of the content of the storage medium such as writing data or erasing data. Harmful commands that cause alteration of the storage medium would cause the evidentiary value of the storage medium to be compromised.

If the intercept logic 140 determines that the command is benign, the intercept logic 140 allows the command to pass to the storage device 170. If the intercept logic 140 determines that the command is harmful, the intercept logic 140 replaces the harmful command with a benign replacement command and passes the benign replacement command to the storage device 170. The intercept logic 140 also emulates any required response expected to result from the harmful command and passes the emulated response to the personal computer 110.

Figure 2:
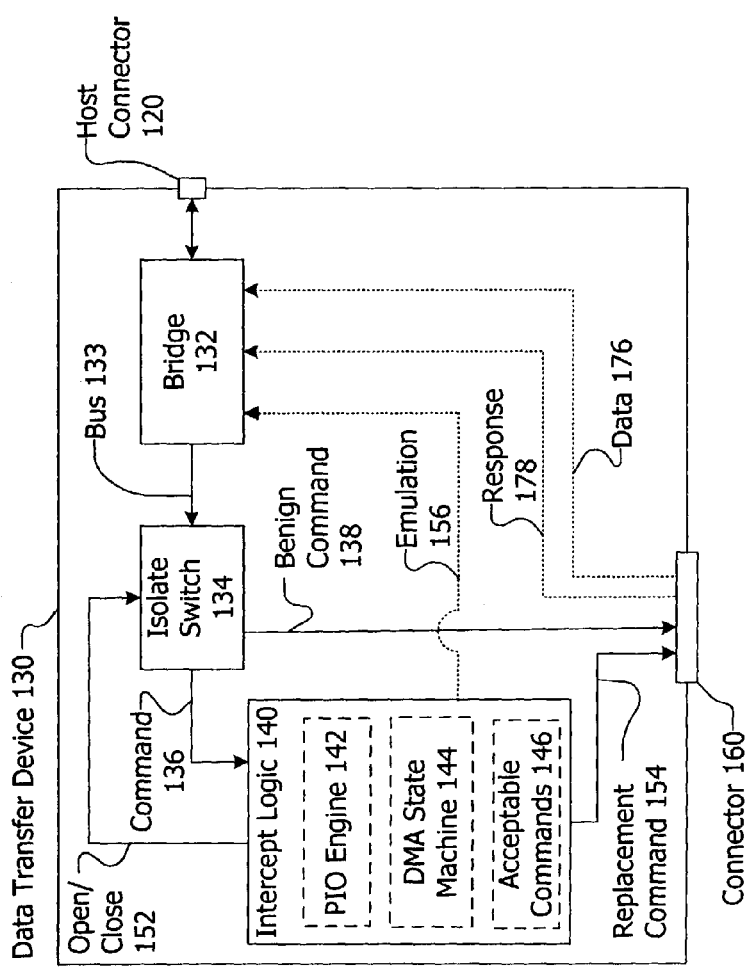
FIG. 2 is a block diagram of a device in accordance with the invention.

FIG. 2 is a block diagram of a data transfer device 130 in accordance with the invention. FIG. 2 illustrates the flow of information between the components of the data transfer device 130 as depicted by the various lines shown in FIG. 2, such as the flow of benign command 138, emulation 156, and replacement command 154. These lines are provided for descriptive purposes, and may or may not be included as data carrying lines or data paths in various embodiments of the data transfer device 130.

In one embodiment, the bridge 132 is coupled to the peripheral connector 120, the isolate switch 134, the intercept logic 140 and the connector 160. Generally, the bridge 132 allows for data transfers via peripheral connector 120 with a computing device according to any of the data transfer standards while also allowing data transfers with a storage device coupled via connector 160. In one embodiment, bridge 132 is an integrated circuit which allows for the two-way transfer of information between ATA compatible hard disks and USB compatible computing devices. Such an integrated circuit chip is available from, for example, Cypress Semiconductor Corporation of San Jose, Calif.

In various embodiments, peripheral connector 120 and the connector 160 may conform to the same data transfer standard or may conform to different data transfer standards. The peripheral connector 120 and connector 160 correspond to the data transfer standards supported by the bridge 132 in a particular embodiment.

In various embodiments, one or more data and/or control buses and/or one or more communications lines may couple the components of the data transfer device 130 to one another. For example, the connection between bridge 132 and isolate switch 134 may be made using a combination data and command bus 133.

Isolate switch 134 may be a software or hardware switch. When the isolate switch 134 is in a closed or first position, commands are passed from bridge 132 to a storage device attached via connector 160. That is, isolate switch 138 allows benign commands 138 to pass to connector 160 when in a closed position. When the isolate switch 134 is an open or second position, commands 136 are diverted from reaching a storage device attached to connector 160 such that commands 136 pass from bridge 132 to intercept logic 140.

Intercept logic 140 may control isolate switch 134. In one embodiment, the intercept logic 140 includes a list of benign commands in an acceptable commands table 146. Intercept logic 140 refers to the acceptable commands table 146 to determine whether a command is benign or harmful. In one embodiment, a command is deemed harmful if it is not found in the acceptable commands table. In other embodiments, other tables and/or lists of harmful commands, benign commands, or both may be included in or be accessible to the intercept logic 140.

When the intercept logic 140 determines that a command is benign, the intercept logic 140 allows the isolate switch 134 to remain in its closed position, allowing the benign command 138 to be presented to a storage device attached via connector 160.

When the intercept logic 140 determines that a command is harmful, intercept logic 140 opens isolate switch 134, to prevent transfer of the harmful command to an attached storage device via connector 160. Intercept logic 140 opens isolate switch 134 via open/close line 152 and causes a replacement command 154 to pass to the attached storage device in lieu of the harmful command. In an embodiment in which the attached storage device is a hard disk, the replacement command 154 is a seek command directed to a location in the hard disk specified by the harmful command. In this way, the timing integrity of the operation of the hard disk remains intact and in conformance with a governing standard, such as the ATA standard. In addition, intercept logic 140 emulates any response expected by the issuer of the harmful command to ensure that the data transfer device conforms to any governing standard, such as the ATA standard.

Connector 160 may allow for coupling to a storage device according to any of the data transfer standards. Connector 160 allows an attached storage device to present any requested data 176 and any expected response 178 to bridge 132 for communication to a computing device attached via peripheral connector 120.

Figure 3:
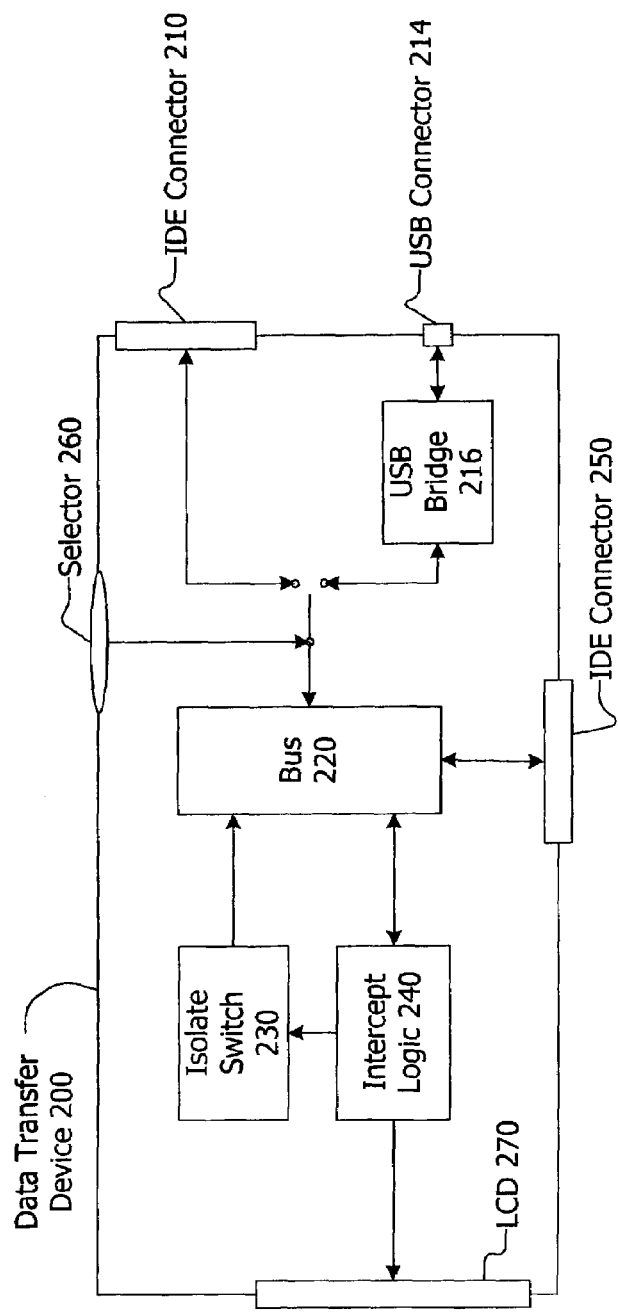
FIG. 3 is a block diagram of a second device in accordance with the invention.

FIG. 3 is a block diagram of a second device in accordance with the invention. Data transfer device 200 has similar functionality to the data transfer device 130 shown in FIGS. 1 and 2 with some additional features. Rather than having a single host connector, the data transfer device has two host connectors, IDE connector 210 and USB connector 214. IDE connector 210 allows data transfer device 200 to be coupled directly to the motherboard of a personal computer inside the housing of a personal computer, while USB connector 214 allows the data transfer device to operate in a manner similar to data transfer device 130 shown in FIG. 1. Another additional feature of data transfer device 200 is the addition of a liquid crystal display (LCD) 270. LCD 270 may be any screen capable of displaying information.

IDE connector 250 allows the data transfer device to be coupled to a storage device, such as, for example, a hard disk drive.

Selector switch 260 is coupled to IDE connector 210 and USB bridge 216. Selector 216 enables a user to choose whether the data transfer device 200 should communicate with a computing device via USB connector 214 or IDE connector 210. A selector switch 260 included in data transfer device 200 allows a user to select between IDE connector 210 and USB connector 214. Selector switch 260 allows an investigator, lab technician, or other user of data transfer device 200 to physically specify how the data transfer device is connected by pressing or otherwise activating selector switch 260. When selector 260 is in a first position, information from a an attached computing device passes from IDE connector 210 to bus 220. When selector 260 is in a second position, information from a an attached computing device passes from USB connector 214 through USB bridge 216 to bus 220. Similarly, depending on the setting of selector switch 260, a storage device attached via IDE connector 250 may direct any data or information to an attached computing device via IDE connector 210 or via USB bridge 216 and USB connector 214.

Intercept logic 240 functions in generally the same way as intercept logic 140. Intercept logic 240 evaluates commands received via or accessible on bus 220 that are directed to an attached storage device. When a command is benign, intercept logic 240 takes no action and isolate switch 240 remains closed so that the benign commands may be presented to an attached hard disk via IDE connector 250. When a command is harmful, intercept logic 240 opens isolate switch 30, replaces the harmful command with a benign replacement command, and directs an emulation of a response expected of the harmful command, if any, to an attached computing device via IDE connector 210 or via USB bridge 216 and USB connector 214.

Intercept logic 240 is coupled to LCD 270. Intercept logic 240 may use LCD 270 to display the name of a current harmful command. Intercept logic 240 may also use LCD 270 to display a running tally of the number of harmful commands detected. In another embodiment, intercept logic 240 may use LCD 270 to display in real time the names of all commands directed to an attached storage device. In this way, data transfer device 200 may present a real-time view of the activity directed to a connected hard disk.

Figure 4:
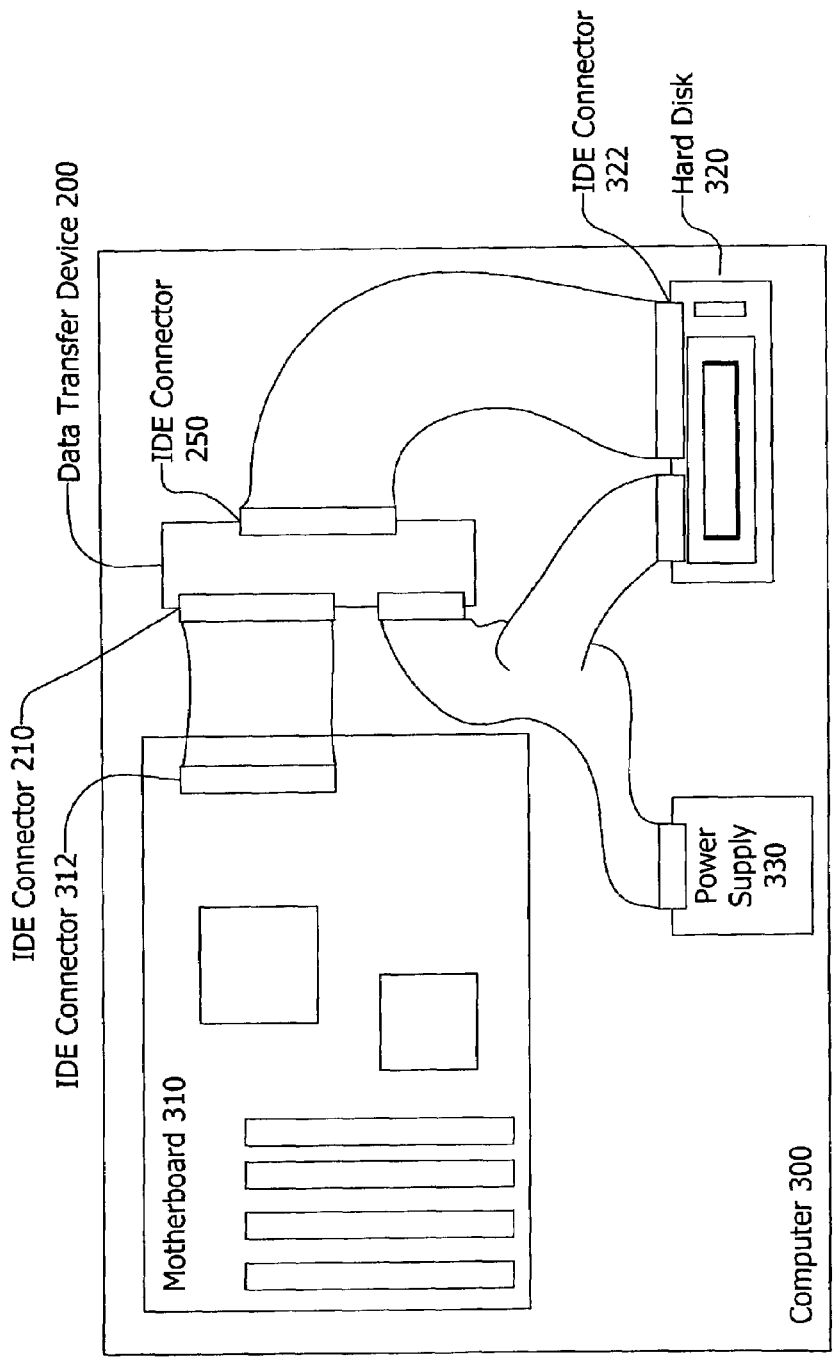
FIG. 4 is a block diagram of a personal computer having installed therein a device in accordance with the invention.

FIG. 4 is a block diagram of a personal computer having installed therein a device in accordance with the invention. In this embodiment, data transfer device 200 prevents unwanted writes or other alteration of a hard disk when placed between the motherboard of a computing device and a storage device. In those circumstances where a computing device is being used as a server, and in particular an Internet web server, a data transfer device like that described herein may be coupled between a motherboard included in the computing device and a storage device to prevent alteration of a company's or person's web site data or other data stored on the storage device.

When inserted between motherboard 310 and hard disk 320, data transfer device 200 makes hard disk 320 a read-only drive. In this way, data transfer device 200 may serve to thwart hackers from altering, rewriting, defacing or erasing the content of a web site from the hard disk 320 of computer 300 serving as a web or other network server.

In typical computers, a hard disk is coupled to an IDE connector on the motherboard of the computer. The motherboard typically includes an IDE/ATA controller. In one embodiment, data transfer device 200 is coupled between the motherboard 310 of computer 300 and hard disk 320. The hard disk 322 of the computer 300 may be disconnected from the motherboard 310 and attached to IDE connector 250 of data transfer device 200. An additional ribbon cable may be used to couple data transfer device 200 to IDE connector 312 of motherboard 310 via IDE connector 210. Power may be supplied to hard disk 320 by power supply 330. Power supply 330 is typical of the power supplies included in personal computers and server computers. Data transfer device 200 may also obtain power from power supply 330.

Similarly, the data transfer device 200 may be coupled between rack mount servers and hard disk bay with a group of one or more hard disks configured as Just a Bunch Of Disks (JBOD) or as a Redundant Array of Independent Disks (RAID). In this way, the JBOD or RAID disks become read-only devices such the data transfer device thwarts attempts by hackers to alter or erase web page data or other data stored on the hard drives. In these embodiments, the data transfer device 200 may be constructed to support one or more data transfer standards by which the rack mount servers communicate with one or more hard disk drives or other writable storage device.

Figure 5:
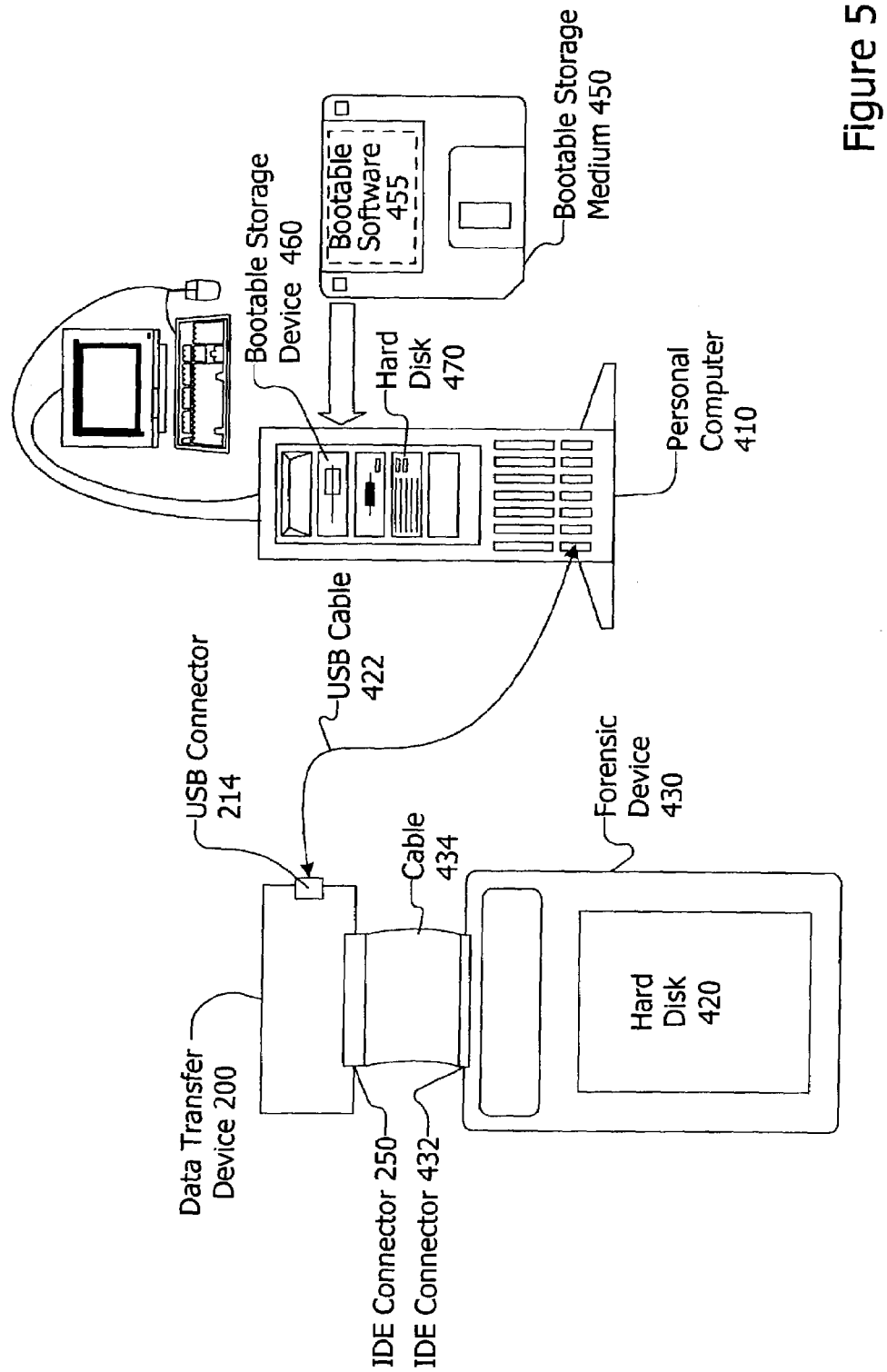
FIG. 5 is a block diagram of a second system in accordance with the invention.

FIG. 5 is a block diagram of a second system in accordance with the invention. According to this embodiment, data transfer device 200 is coupled between a suspect's personal computer 410 and a hard disk 420 placed in a forensic device 430. Data transfer device 200 is coupled to a suspect's personal computer 410 via USB connector 214 and USB cable 422. In one embodiment, the forensic device 430 is coupled to data transfer device 200 via IDE connectors 250 and 432 over cable 434.

Personal computer 410 may include a bootable storage device 460 such as a floppy disk drive, CD drive, DVD drive or other bootable storage device and a second storage device, such as a hard disk 470. The hard disk 470 may be the storage device that includes the operating system and that is typically booted when the personal computer is powered on or restarted.

A bootable storage medium 450 containing bootable software 455 is provided. The bootable storage medium 450 may be placed in the bootable storage device 460 so that the bootable software 455 is executed by the personal computer 410 when the personal computer 410 is powered on or rebooted. The bootable software 455 contains object code or other executable instructions which are executable by the processor in personal computer 410. The bootable software 455 may include one or more command sequences which are sent to data transfer device 200 over USB cable 422 when personal computer 410 boots from bootable storage medium 450. The command sequences may invoke special functionality included in the data transfer device 200. In one embodiment, the special functionality includes disabling the read-only, nondestructive access feature of the data transfer device.

Description of the Methods

Figure 6:
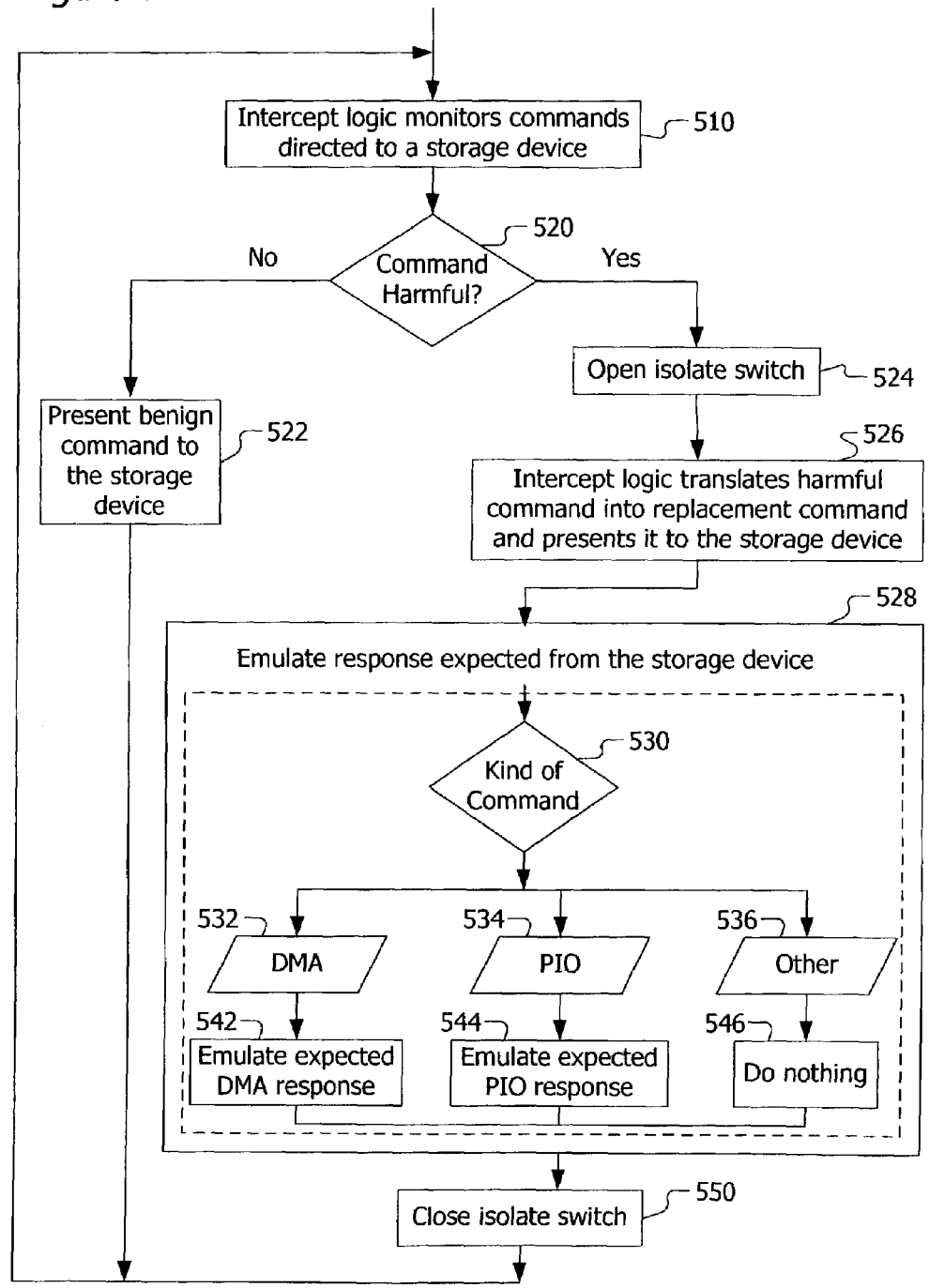
FIG. 6 is a flow chart of the actions taken in accordance with the invention.

FIG. 6 is a flow chart of the actions taken in accordance with the invention. The method for accessing data described herein presumes that a data transfer device like data transfer devices 130 or 200 is coupled between a storage device and a computing device, and, in one embodiment, between a hard disk and a personal computer, as shown in FIG. 1 and FIG. 3, and/or between a forensic device and a personal computer, as shown in FIG. 5.

In the flow of actions shown in FIG. 6, the intercept logic of the data transfer device monitors commands directed to an attached storage device, as shown in block 510. In an embodiment in which the attached storage device is an ATA/IDE hard disk, commands are directed to the hard disk according to the ATA standard. According to the ATA standard, commands are written to register 7 of the hard disk. As such, in this embodiment, intercept logic 140 examines all requests to write data to register 7 of the hard disk. That is, the intercept logic monitors all attempts to write to or actual writes to register 7 of the hard disk.

The intercept logic evaluates the commands to determine whether they are harmful, as shown in block 520. In one embodiment, this evaluation may be made by checking whether the command is on an acceptable command list or in an acceptable command table. If the command is not harmful, the benign command is presented to the storage device, as shown in block 522.

If the command is harmful, the intercept logic opens the isolate switch so that the harmful command is prevented from reaching the storage device, as shown in block 524. The intercept logic translates the harmful command into a benign replacement command which is presented to the storage device in place of the harmful command, as shown in block 526. In the embodiment in which the storage device is a hard disk, the replacement command is written to register 7 of the hard disk in place of the harmful command.

In addition, when the command is harmful, the intercept logic of the data transfer device emulates a response to the harmful command expected from the storage device, as shown in block 528. In various embodiments, the emulated response is the response expected according to whatever standard governs the particular storage device. An emulated response is prepared so that conformance with any governing data transfer standards is maintained. The emulated response may be prepared so that control and timing signals of the storage device are not altered from what is expected in response to the harmful command.

In the embodiment in which the storage device is a hard disk, the intercept logic takes actions to prepare the appropriate emulated response. The emulated response may be the response expected according to a hard disk standard such as the ATA standards. An emulated response is prepared so that the control and timing signals of the hard disk are not altered and so that proper timing and conformance with the ATA standards is maintained. In this embodiment, the intercept logic evaluates the harmful command to determine its kind. In one embodiment, the kinds of commands are categorized as Direct Memory Access (DMA) commands, Programmed Input/Output (PIO) command, and "do nothing" commands.

If the command is a DMA command, as shown in block 532, the intercept logic emulates an expected response to the harmful command, as shown in block 542. More specifically, the intercept logic refers to its DMA state machine to prepare the proper emulation of an expected response to the harmful command. The DMA emulation includes, in one embodiment, emulating an expected DMA command handshake by issuing the following control signals: DMAACK, DDMARDY, INTRQ. As used herein DMA includes ultra DMA (UDMA) and similar commands.

If the command is a PIO command, as shown in block 534, the intercept logic emulates an expected response to the harmful PIO command, as shown in block 544. More specifically, the intercept logic refers to the PIO Engine to prepare the appropriate emulation of an expected response to the harmful command. The PIO emulation includes, in one embodiment, counting down an amount of time based on the write strobe associated with the hard disk.

If the kind of harmful command is neither DMA nor PIO, it is an "other" command, as shown in block 536. The intercept logic takes no action, that is, does nothing, when the kind of command is "other", as shown in block 546. More specifically, "other" or "do nothing" commands are those harmful commands for which no response is expected. For these commands, the intercept logic needs to do nothing to emulate a proper expected response. When this kind of harmful command is received, the intercept logic does nothing. Example "other"/"do nothing" commands include erase the contents of the hard disk and format the hard disk.

After emulating a response expected from the storage device, as shown in block 528, the intercept logic closes the isolate switch, as shown in block 550, so that the flow of commands to the storage device resumes.

The flow of actions after blocks 522 and 550 continues with the intercept logic intercepting and monitoring commands at block 510.

In another embodiment, the method described regarding FIG. 6 may be implemented in software instructions included on a machine readable medium. The software instruction are executed by a processor in a computing device. The machine readable medium may be any of the storage media described above, may be silicon devices such as electronically erasable programmable read-only memory (EEPROM) devices, and may be other machine readable media.

Another method may be implemented in system like that described above with regard to FIG. 5. In certain situations when time is of the essence, it may be necessary for an investigator to immediately obtain a copy of a suspect's storage device, and, in particular, a suspect's hard disk. According to this method, an investigator or other person may obtain a copy of a suspect's hard disk and analyze the copy of the hard disk in the field. The copy of the hard disk may be made without moving the suspect's computer to the investigator's lab or office, and without removing the hard drive from the suspect's computer.

According to this method, an investigator or other user attaches a data transfer device 200 as described above with regard to FIG. 3 between a forensic device 430 having a investigator's hard disk 420 included therein and a suspect's personal computer 410, as shown in FIG. 5. As described above regarding FIG. 3, data transfer device 200 typically prevents the writing of data to a hard disk to which it is coupled. However, data transfer device 200 may be configured to allow for the speedy copying a suspect computer's hard disk 470, to an investigator's hard disk 420 included in a forensic device 430. The suspect's hard disk 470 may be considered the source hard disk, and the investigator's hard disk 420 may be considered the destination hard disk. This embodiment method allows for a copy of a suspect's hard disk 470 to be made on an investigator's hard disk 420 at a location where the suspect's computer is found. The investigator may then use the forensic device 430 to readily access and examine the copy of the suspect's hard disk located on the investigator's hard disk 420. An example forensic device is the SF-5000u manufactured by Logicube of Chatsworth, Calif. In this way the suspect's hard disk 470 remains unaltered in the suspect's computer, and the copy of the suspect's hard disk located on the investigator's hard disk 420 may be analyzed without altering either the contents of the suspect's hard disk 470 or the copy contained on the investigator's hard disk 420.

According to this method, to preserve the data integrity of a hard disk in a suspect's computer, the suspect's computer is not booted from its native operating system. It is necessary to start the suspect's computer without running the native operating system because the operating system running on most personal computers, often a version of Microsoft Windows, writes to the hard disk when booting up. To achieve this, after data transfer device 200 is coupled between forensic device 430 and personal computer 410, bootable storage medium 450 is placed in bootable storage device 460 of personal computer 410. When the personal computer 410 is powered on, personal computer 410 executes the bootable software 455 from the bootable storage medium 450.

In some situations the basic input output system (BIOS) of the personal computer may need to be set so that the personal computer 410 boots from the desired storage device, namely bootable storage device 460. Because the bootable software 455 is executed, the native operating system is not booted, and the contents of the suspect's hard disk 470 remain unaltered and the data integrity of the suspect's hard disk 470 is maintained.

Upon starting the personal computer, the bootable software 455 causes a command sequence to be sent to data transfer device 200 over USB cable 422. The command sequence is kept secret and is not publicly available to the user of data transfer device 200. The command sequence temporarily disables the read-only functionality of the data transfer device. The intercept logic 240 in data transfer device 200 receives the command sequence and, in response, disables isolate switch 230 so that data may be written to hard disk 420 in forensic device 430. The intercept logic may refer to a command sequence table, list, memory location or other storage area to determine whether the command sequence is a valid command sequence. The bootable software 455 then causes all of the data from a hard disk 470 in personal computer 410 to be copied to hard disk 420 in forensic device 430. Upon completion of the copying, the bootable software 455 sends a second command sequence to data transfer device 200 over USB cable 422 to return the data transfer device 200 to normal operation so that no data may be written to hard disk 420 of forensic device 430. The first command sequence may be considered a disable read-only mode command sequence, and the second command sequence may be considered a resume read-only mode command sequence.

In addition, in one embodiment, whenever data transfer device 200 is powered on or off and whenever a computing device is attached or unattached from data transfer device 200 via USB connector 220, the data transfer device reverts to its default state of preventing any harmful commands from being passed to a storage device coupled via IDE connector 250.

According to this method, the forensic device 430 may be used to analyze hard disk 420 in the field, at the scene of the crime, so to speak, without endangering the evidentiary integrity of the information on the hard disk 470 of the suspect's personal computer 410. In this way, a copy of the suspect's hard disk 470 or other storage medium may be made and the investigator's copy may be analyzed in the field while preserving the integrity of the suspect's storage medium.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A device to transfer data from a hard disk which prevents modification of the hard disk, the device comprising:
    a bridge interface by which the device may connect to a computing device via a first connector and to the hard disk via a second connector,
    an intercept logic to intercept commands received from the computing device, to evaluate whether the commands are harmful or benign, to present a replacement command to the hard disk when a current command is harmful to the hard disk, and to emulate a response expected from the hard disk when the current command is harmful to the hard disk.

2. The device of claim 1 further comprising:
    an isolate switch to receive commands from the computing device directed to the hard disk, to direct the commands to the hard disk when in a closed state and to prevent the incoming commands from reaching the hard disk when in an open state, the isolate switch coupled to the bridge interface to receive the incoming commands, the isolate switch coupled to the intercept logic,
    wherein the intercept logic is further configured to set the isolate switch to the closed state when the current command is benign, and to set the isolate switch to the open state when the current command is harmful.

3. The device of claim 1 wherein
    the hard disk conforms to an Advanced Technology Attachment (ATA) standard
    the bridge interface is a Universal Serial Bus (USB)/ATA bridge.

4. The device of claim 1 wherein
    the hard disk conforms to an Advanced Technology Attachment (ATA) standard
    the bridge interface is an IEEE 1394/ATA bridge.

5. The device of claim 1 further comprising
    a third connector by which the device may be connected to a motherboard of a computing device
    a selector switch responsive to a user selection of whether the device is coupled to the computing device via the bridge unit or to the motherboard via the third connector.

6. The device of claim 5 wherein the third connector conforms to the Advanced Technology Attachment (ATA) standard.

7. The device of claim 1 wherein the intercept logic includes an acceptable commands table to which the intercept logic refers to determine whether the current command is harmful.

8. The device of claim 1 wherein the intercept logic includes
- a dynamic memory access (DMA) state machine to emulate an expected DMA response if the current command is a DMA command
- a programmed input/output (PIO) engine to emulate an expected PIO response if the current command is a PIO command.

9. The device of claim 1 wherein the intercept logic is further configured to check whether a first command sequence is received, and if the first command sequence is received
- to allow for data to be written to the hard disk
- to temporarily disable the intercept logic.

10. A device to transfer data from a storage device which prevents modification of a storage medium included in the storage device, the device comprising:
- a bridge interface by which the device may connect to a computing device via a first connector and to the storage device via a second connector,
- an intercept logic to intercept commands received from the computing device, to evaluate whether the commands are harmful or benign, to present a replacement command to the storage device when a current command is harmful to the storage medium, and to emulate a response expected from the storage device when the current command is harmful to the storage medium.

11. The device of claim 10 further comprising:
- an isolate switch to receive commands from the computing device directed to the storage device, to direct the commands to the storage device when in a closed state and to prevent the incoming commands from reaching the storage device when in an open state, the isolate switch coupled to the bridge interface to receive the incoming commands, the isolate switch coupled to the intercept logic,
- wherein the intercept logic is further configured to set the isolate switch to the closed state when the current command is benign, and to set the isolate switch to the open state when the current command is harmful.

12. The device of claim 10 wherein the bridge interface allows for data transfer according at least one of a Universal Serial Bus (USB) standard, an IEEE 1394 standard, a small computer system interface (SCSI), a Fibre Channel standard, an Advanced Technology Attachment (ATA) standard, and an integrated drive electronics (IDE) standard.

13. The device of claim 10 wherein the storage device is one of a hard disk, a floppy disk, a compact disk, a digital versatile disk, and a flash memory device.

14. The device of claim 10 further comprising
- a third connector by which the device may be connected to a motherboard of a computing device
- a selector switch responsive to a user selection of whether the device is coupled to the computing device via the bridge unit or to the motherboard via the third connector.

15. The device of claim 14 wherein the third connector conforms to at least one of a Universal Serial Bus (USB) standard, an IEEE 1394 standard, a small computer system interface (SCSI), a Fibre Channel standard, an Advanced Technology Attachment (ATA) standard, and an integrated drive electronics (IDE) standard.

16. The device of claim 10 wherein the intercept logic includes an acceptable commands table to which the intercept logic refers to evaluate whether the commands are harmful or benign.

17. The device of claim 10 wherein the intercept logic is further configured to check whether a first command sequence is received, and if the first command sequence is received
- to allow for data to be written to the storage medium
- to temporarily disable the intercept logic.

18. A system comprising the device of claim 10 in which the device is coupled to the computing device via the first connector and coupled to the storage device via the second connector.

19. The system of claim 18 wherein the first connector is a USB connector and the second connector is an IDE connector.

20. A system comprising the device of claim 14 in which the device is coupled to the motherboard of the computing device by the third connector and to the storage device via the second connector.

21. A system comprising the device of claim 1 in which the device is coupled to a rack mount server via the first connector and coupled to a group of hard disks via the second connector.

* * * * *